United States Patent
Kang et al.

(10) Patent No.: US 9,300,824 B2
(45) Date of Patent: Mar. 29, 2016

(54) METHOD AND IMAGE FORMING APPARATUS TO GENERATE USER INTERFACE SCREEN TO BE DISPLAYED TO USER ACCESSING THE IMAGE FORMING APPARATUS

(75) Inventors: Soo-young Kang, Seoul (KR); So-young Kim, Suwon-si (KR); Seung-soo Oak, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 388 days.

(21) Appl. No.: 13/137,629

(22) Filed: Aug. 30, 2011

(65) Prior Publication Data

US 2012/0081729 A1   Apr. 5, 2012

(30) Foreign Application Priority Data

Sep. 30, 2010 (KR) .................. 10-2010-0095476

(51) Int. Cl.
*H04N 1/00* (2006.01)
(52) U.S. Cl.
CPC ......... *H04N 1/0035* (2013.01); *H04N 1/00344* (2013.01)
(58) Field of Classification Search
CPC .................. H04N 1/00344; G06F 3/04842
USPC ............... 358/1.15, 1.13; 715/824, 825, 750; 345/594
See application file for complete search history.

(56) References Cited

U.S. PATENT DOCUMENTS

| 2005/0114767 | A1 | 5/2005 | Sato | |
|---|---|---|---|---|
| 2006/0007469 | A1 | 1/2006 | Uruma | |
| 2008/0036779 | A1* | 2/2008 | Hozumi | G06F 9/4443 345/520 |
| 2008/0068647 | A1* | 3/2008 | Isobe et al. | 358/1.15 |
| 2008/0288879 | A1* | 11/2008 | Tomita et al. | 715/762 |
| 2009/0161144 | A1 | 6/2009 | Huang | |
| 2009/0164927 | A1 | 6/2009 | Nakahara | |
| 2010/0067035 | A1* | 3/2010 | Kawakubo et al. | 358/1.13 |
| 2010/0177341 | A1 | 7/2010 | Mihara | |

FOREIGN PATENT DOCUMENTS

| CN | 101465931 | 6/2009 |
|---|---|---|
| EP | 1553525 A2 | 7/2005 |
| EP | 1903767 A1 | 3/2008 |

OTHER PUBLICATIONS

Extended European Search Report dated Mar. 2, 2012 issued in corresponding European Patent Application No. 11180338.3.
European Office Action issued Jul. 12, 2013 in corresponding European Application No. 11180338.3.
Chinese Office Action dated Feb. 3, 2015 from Chinese Patent Application No. 201110302756.8, 16 pages.

* cited by examiner

*Primary Examiner* — Jacky X Zheng
(74) *Attorney, Agent, or Firm* — Staas & Halsey LLP (57) ABSTRACT

An image forming apparatus includes a state management unit to manage state information of the image forming apparatus; a determination unit to determine functions allowable to the user accessing the image forming apparatus according to the state information; a web server unit to generate the user interface screen on which functions are activated according to a result of the determining; and a control unit to control the image forming apparatus to display the generated user interface screen to the user.

19 Claims, 6 Drawing Sheets

| CURRENTLY PERFORMED FUNCTION | Copy | Scan to XXX | Fax | Document Box | USB print |
|---|---|---|---|---|---|
| Copy | X | X | X | O | O |
| Scan to XXX | X | X | X | O | O |
| Fax | X | X | X | O | O |
| Document Box | O | O | O | O | O |
| USB Print | O | O | O | O | O |

METHOD AND IMAGE FORMING APPARATUS TO GENERATE USER INTERFACE SCREEN TO BE DISPLAYED TO USER ACCESSING THE IMAGE FORMING APPARATUS

CROSS-REFERENCE TO RELATED APPLICATIONS

This application claims the benefit of Korean Patent Application No. 10-2010-0095476, filed on Sep. 30, 2010, in the Korean Intellectual Property Office, the disclosure of which is incorporated herein in its entirety by reference.

BACKGROUND

1. Field

The present disclosure relates to a method and image forming apparatus to generate a user interface screen to be displayed to a user accessing the image forming apparatus.

2. Description of the Related Art

Image forming apparatuses are apparatuses for generating, printing, receiving, and transmitting image data, and include a printer, a scanner, a copier, a fax, and a multi-function printer. A user using an image forming apparatus may operate and set the image forming apparatus, may check state information of the image forming apparatus, or may select a function desired to be performed on the image forming apparatus, by using a user interface screen. Also, the user may access the image forming apparatus locally by using a web browser in the image forming apparatus or remotely by using a web browser of an external device. Accordingly, a plurality of users may simultaneously access the image forming apparatus, and functions desired by the accessing users to be performed on the image forming apparatus may conflict with each other.

SUMMARY

The present disclosure provides a method and image forming apparatus to generate a user interface screen on which functions allowable according to the state of the image forming apparatus are activated and which is displayed to a user accessing the image forming apparatus.

According to an aspect of the present disclosure, there is provided an image forming apparatus to generate a user interface screen to be displayed to a user accessing the image forming apparatus, the image forming apparatus including a state management unit to manage state information of the image forming apparatus; a determination unit to determine functions allowable to the user accessing the image forming apparatus according to the state information; a web server unit to generate the user interface screen on which functions are activated according to a result of the determining; and a control unit to control the image forming apparatus to display the generated user interface screen to the user.

According to another aspect of the present disclosure, there is provided a method of generating a user interface screen to be displayed to a user accessing an image forming apparatus, the method including accessing the image forming apparatus; checking state information of the image forming apparatus; determining functions allowable to the user accessing the image forming apparatus according to the state information; generating the user interface screen on which functions are activated according to a result of the determining; and displaying the generated user interface screen to the user.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

Figure 1:
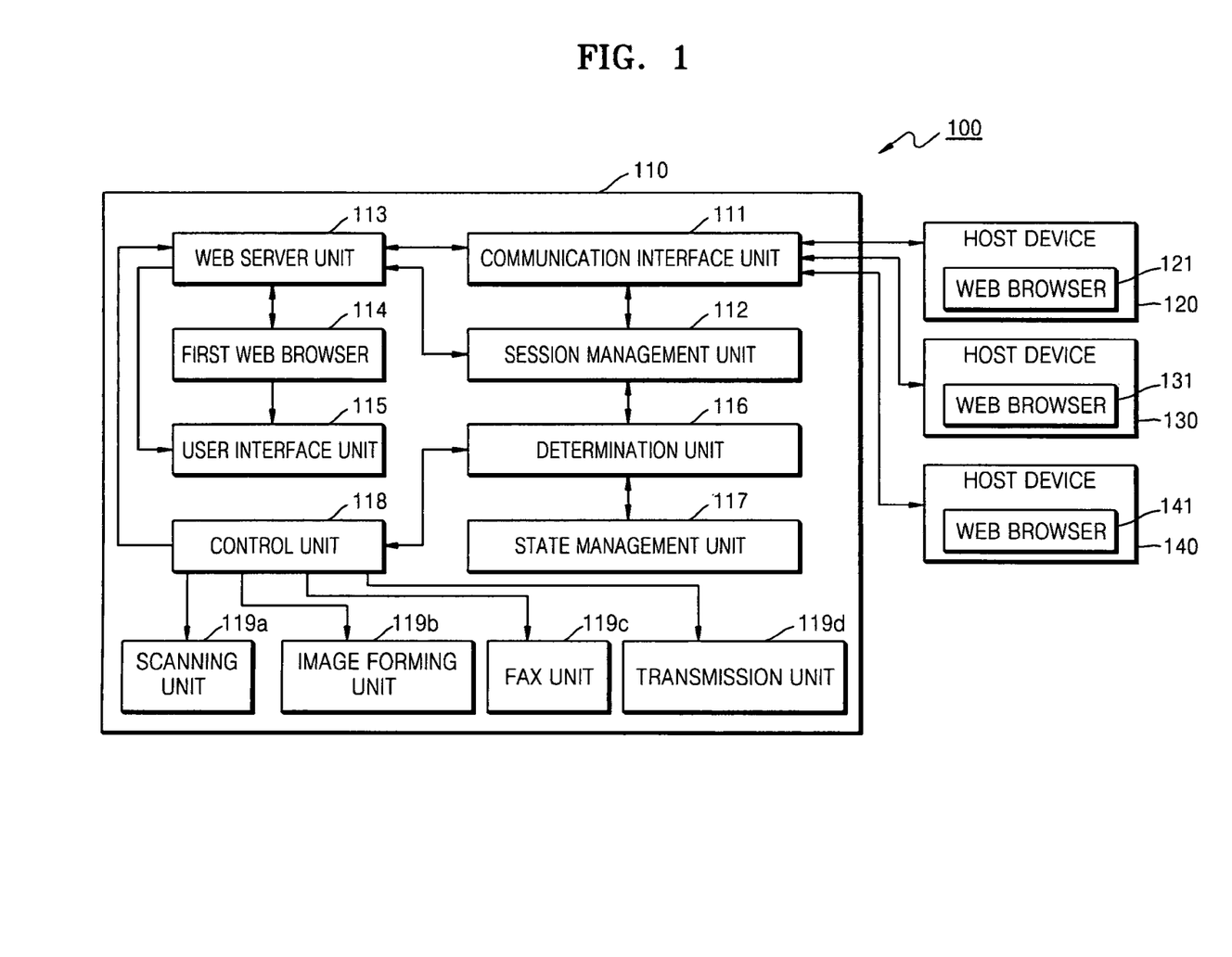
FIG. 1 is a block diagram of an image forming system and an image forming apparatus to control access of a plurality of users, according to an embodiment of the present disclosure.

The present disclosure will now be described more fully with reference to the accompanying drawings, in which exemplary embodiments of the present disclosure are shown. FIG. 1 is a block diagram of an image forming system 100 and an image forming apparatus 110 to control access of a plurality of users, according to an embodiment of the present disclosure. The image forming system 100 includes the image forming apparatus 110 and a plurality of host devices 120, 130, and 140. Although three host devices 120, 130, and 140 are illustrated in FIG. 1, the number of host devices connected to the image forming apparatus 110 is not limited to three. As illustrated in FIG. 1, the host devices 120, 130, and 140 may be connected to the image forming apparatus 110. Also, any device including a web browser may be used as a host device to be connected to the image forming apparatus 110 and thus the type of host device is not particularly restricted.

Furthermore, the image forming apparatus 110 includes a communication interface unit 111, a session management unit 112, a web server unit 113, a first web browser 114, a user interface unit 115, a determination unit 116, a state management unit 117, a control unit 118, a scanning unit 119a, an image forming unit 119b, a fax unit 119c, and a transmission unit 119d.

The host devices 120, 130, and 140 respectively include web browsers 121, 131, and 141 and access the communication interface unit 111 of the image forming apparatus 110 by using the web browsers 121, 131, and 141. Accordingly, various types of wired or wireless communication are allowed between the image forming apparatus 110 and the host devices 120, 130, and 140 via the communication interface unit 111. A uniform resource locator (URL), indicating the web server unit 113 of the image forming apparatus 110, may be input on the web browsers 121, 131, and 141 of the host devices 120, 130, and 140, and thus, the host devices 120, 130, and 140 may access the communication interface unit 111 connected to the web server unit 113 of the image forming apparatus 110.

The session management unit 112 manages a connection state between the image forming apparatus 110 and the host device 120 accessing the image forming apparatus 110. If the host device 120 accesses the communication interface unit 111, the session management unit 112 registers the accessing host device 120. Accordingly, history information regarding the host device 130 previously accessing the image forming apparatus 110 as well as the host device 120 currently accessing the image forming apparatus 110 may be managed.

Also, the web server unit 113 of the image forming apparatus 110 may be locally accessed by using the first web browser 114 in the image forming apparatus 110. The first web browser 114 of the image forming apparatus 110 may be displayed on the user interface unit 115, and a user may access the web server unit 113 of the image forming apparatus 110 by using the first web browser 114.

As described above, a user may access the web server unit 113 in the image forming apparatus 110 or from the host device 120 connected to the image forming apparatus 110. Accordingly, in some cases, a plurality of users may simultaneously access the web server unit 113 in the image forming apparatus 110 or from the host devices 120, 130, and 140.

The web server unit 113 generates contents for forming a user interface (UI) screen of the image forming apparatus 110 by using a web-based language. Here, the UI screen is a screen for operating and setting the image forming apparatus 110, checking state information of the image forming apparatus 110, or selecting a function desired to be performed on the image forming apparatus 110, and is also referred to as a local user interface (LUI) screen. The web server unit 113 generates LUI contents for forming the LUI screen of the image forming apparatus 110 by using a web-based language, and the generated LUI screen of the image forming apparatus 110 is displayed on the user interface unit 115. Also, the image forming apparatus 110 may transmit the LUI contents generated by the web server unit 113 to the host devices 120, 130, and 140 connected to the image forming apparatus 110 via the communication interface unit 111.

Figure 2:
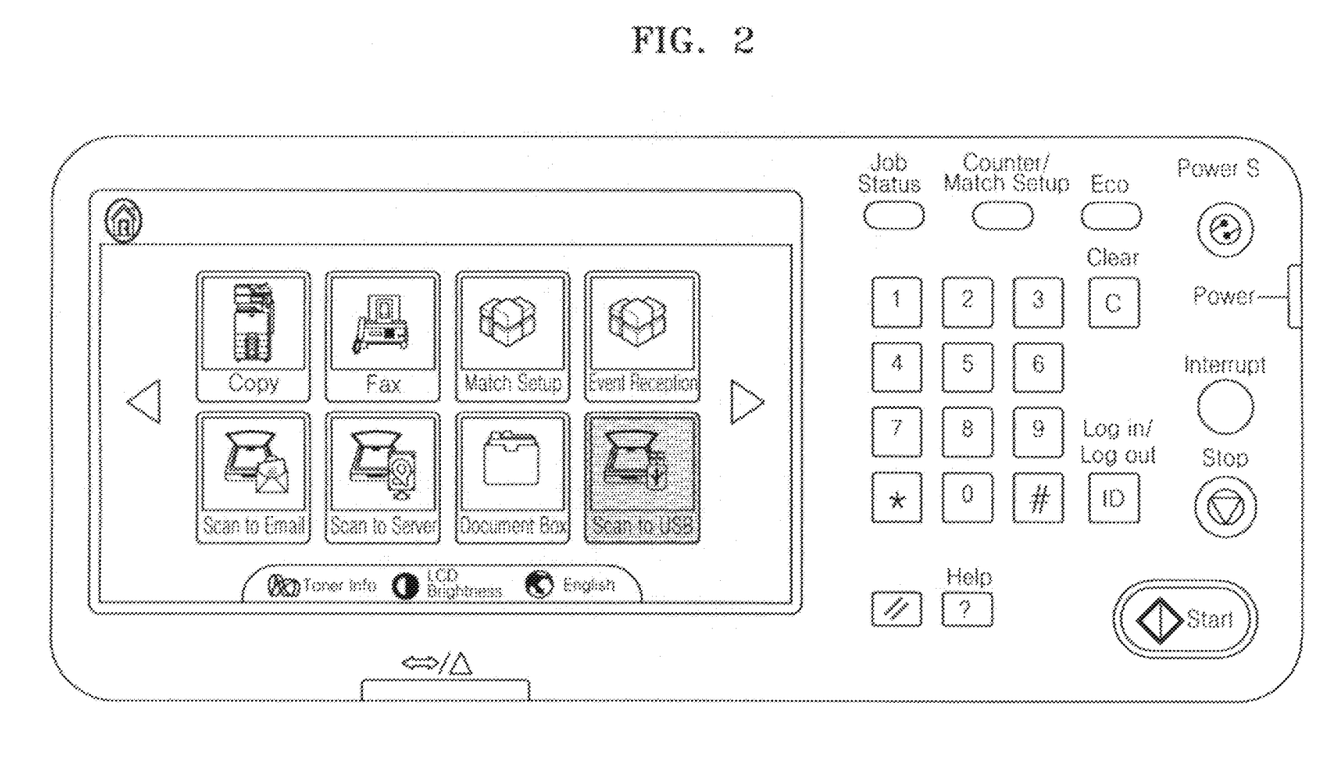
FIG. 2 is an image of a local user interface (LUI) screen displayed on a user interface unit of the image forming apparatus illustrated in FIG. 1, according to an embodiment of the present disclosure.
Figure 3:
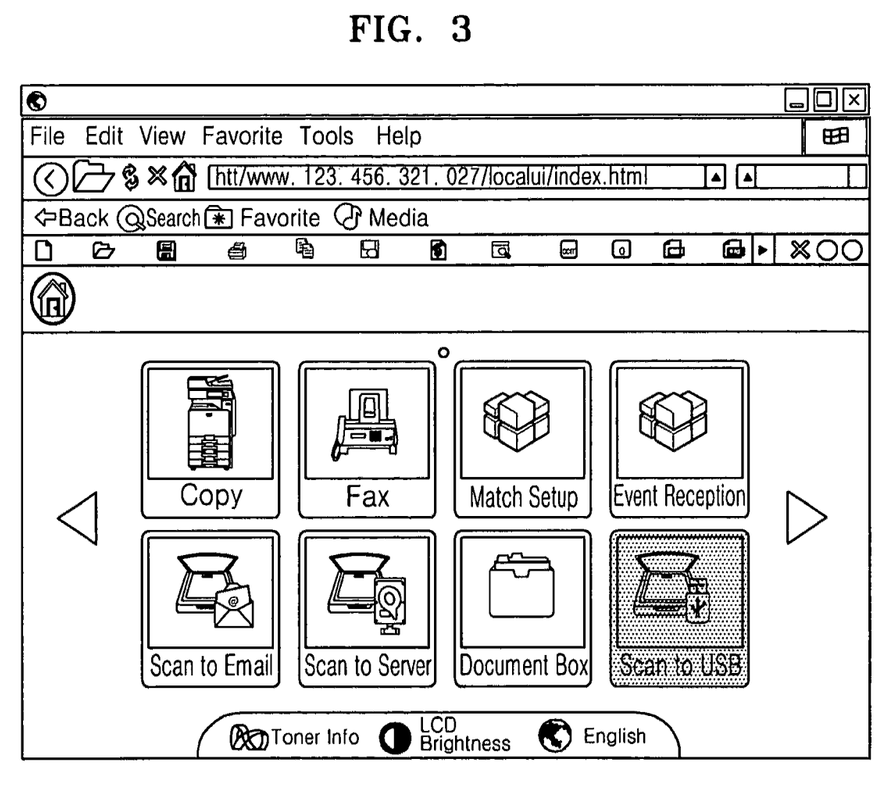
FIG. 3 is an image of an LUI screen displayed on a host device connected to the image forming apparatus illustrated in FIG. 1, according to an embodiment of the present disclosure.

FIG. 2 is an image of an LUI screen displayed on the user interface unit 115 of the image forming apparatus 110 illustrated in FIG. 1, according to an embodiment of the present disclosure. FIG. 3 is an image of an LUI screen displayed on a host device connected to the image forming apparatus 110 illustrated in FIG. 1, according to an embodiment of the present disclosure. The LUI screens illustrated in FIGS. 2 and 3 are screens for selecting a function to be performed by the image forming apparatus 110. Also, as illustrated in FIGS. 2 and 3, the same LUI screen may be displayed on the image forming apparatus 110 and the host device connected to the image forming apparatus 110.

The LUI contents include images, text, and tags. Here, each of the first web browser 114 and the web browsers 121, 131, and 141 may be a web browser such as, for example, Microsoft Internet Explorer (MSIE), Firefox, Opera, Chrome, Safari, Maemo, Android, or Limo. Also, the web-based language may be, for example, hypertext markup language (HTML), extensible markup language (XML), JavaServer pages (JSP), active server pages (ASP), personal hypertext preprocessor (PHP), Flex, or JavaFX.

The determination unit 116 determines whether to allow an access requested by a host device to the image forming apparatus 110. The session management unit 112 manages history information regarding previously accessing host devices as well as a currently accessing host device. Accordingly, the determination unit 116 may determine whether to allow an access requested by the host device to the image forming apparatus 110, by using the history information regarding accessing host devices managed by the session management unit 112. The determination unit 116 may not allow an access requested by a host device by using a web browser not allowed by the image forming apparatus 110. Also, the determination unit 116 may not allow an access requested by a host device that may cause an operation error of the image forming apparatus 110. As described above, the determination unit 116 may restrict an access requested by a host device, according to various conditions set by the image forming apparatus 110 and the state of the image forming apparatus 110.

Also, the determination unit 116 determines functions allowable to a host device accessing the image forming apparatus 110. The determination unit 116 determines functions allowable to the accessing host device by checking the state information of the image forming apparatus 110 received from the state management unit 117.

The state management unit 117 manages the state information of the image forming apparatus 110. Here, the state information of the image forming apparatus 110 represents a function currently performed or ready to be performed by the image forming apparatus 110. Accordingly, the determination unit 116 checks by using the state information received from the state management unit 117 a function currently performed or ready to be performed by the image forming apparatus 110, or an operational amount of the image forming apparatus 110, and determines functions allowable to the accessing host device according to the checking result. That is, the determination unit 116 checks by using the state information received from the state management unit 117 a function currently performed or ready to be performed by the image forming apparatus 110, and determines to allow to the accessing host device only functions which do not conflict with the function currently performed or ready to be performed. For example, if a scanner-related function such as Copy, Scan to Email, Scan to Server, Scan to USB, or Fax is currently performed by the image forming apparatus 110, the determination unit 116 determines not to allow the other scanner-related functions to the accessing host device. Since scanner-related functions use a scanner, while a scanner-related function is performed, the image forming apparatus 110 may not further perform any other scanner-related functions. Although a scanner-related function is currently performed by the image forming apparatus 110, searching and printing functions of a document stored in the image forming apparatus 110 and data transmission functions to other destinations (an email, a server, a universal serial bus (USB), and a fax) do not use a scanner and thus are determined as allowable functions. Although scanner-related functions are described above as conflicting functions between the image forming apparatus 110 and the accessing host device, or between the accessing host devices, any other functions that may not be simultaneously performed by the image forming apparatus 110 may be conflicting functions.

As described above, if a plurality of users simultaneously access a web server unit of an image forming apparatus by using a web browser in the image forming apparatus or by using web browsers of host devices, functions allowable to the accessing users may be restricted to prevent an unexpected result caused when functions desired by the users conflict with each other.

Figure 4:
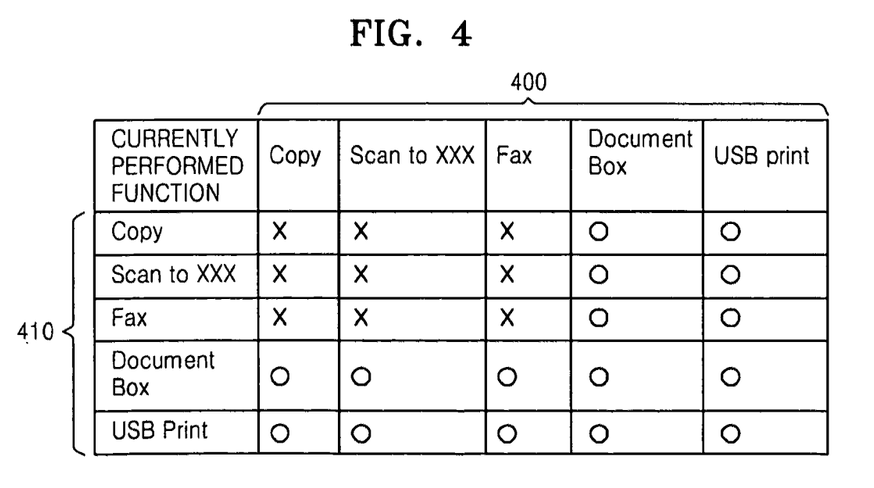
FIG. 4 is a table showing allowable and unallowable functions when two or more users access a web server unit of the image forming apparatus illustrated in FIG. 1, according to an embodiment of the present disclosure.

FIG. 4 is a table showing functions allowable and unallowable when two or more users access the web server unit 113 of the image forming apparatus 110 illustrated in FIG. 1, according to an embodiment of the present disclosure.

In FIG. 4, an upper portion 400 represents functions currently performed by the image forming apparatus 100, and a left portion 410 represents functions desired by the users accessing the web server unit 113 of the image forming apparatus 110. In the table illustrated in FIG. 4, "Copy" represents a function for copying document or image, "Scan to XXX" may be, for example, "Scan to Email", "Scan to Server", or "Scan to USB", and represents a function for transmitting a scanned document to an email, a server, or a USB, "Document Box" represents a function for processing a document stored in a document box of the image forming apparatus 110, and "USB Print" represents a function for printing a document stored in a USB memory stick connected via a USB port. Also, in the table illustrated in FIG. 4, "O" and "X" respectively represent allowable and unallowable functions when a function of the upper portion 400 is currently performed by the image forming apparatus 100. Functions allowable to a plurality of users accessing the image forming apparatus 110 will now be described with reference to FIG. 4. For example, it is assumed that a user "A" uses a "Fax" function of the image forming apparatus 110. In order to use the "Fax" function, the user "A" puts document on a scanner, inputs a destination, and transmits the document. Accordingly, the "Fax" function is a scanner-related function. In this case, the user "A" may access the image forming apparatus 110 remotely by using a web browser of a host device or locally by using the first web browser 114 in the image forming apparatus 110. In this case, a user "B" remotely or locally accesses the image forming apparatus 110. Since the "Fax" function, which is a scanner-related function, is currently performed by the image forming apparatus 110, the user "B" may not use scanner-related functions such as the "Copy", "Scan to XXX", and "Fax" functions and may use only the "Document Box" and "USB Print" functions not related to a scanner. Accordingly, the determination unit 116 determines the "Document Box" and "USB Print" functions as functions allowable to the user "B". As another example, it is assumed that the user "A" uses the "Document Box" function of the image forming apparatus 110. In this case, if the user "B" remotely or locally accesses the image forming apparatus 110, since the "Document Box" function, which is not a scanner-related function, is currently performed by the image forming apparatus 110, the user "B" may use the "Copy", "Scan to XXX", "Fax", "Document Box", and "USB Print" functions. Accordingly, the determination unit 116 determines the "Copy", "Scan to XXX", "Fax", "Document Box", and "USB Print" functions as functions allowable to the user "B".

As described above, the determination unit 116 determines functions allowable to a user locally or remotely accessing the image forming apparatus 110, and transmits the determination result to the control unit 118.

According to the determination result of the determination unit 116, the control unit 118 outputs a control signal to the web server unit 113 to generate LUI contents for activating only functions allowable to the accessing user. The web server unit 113 generates the LUI contents according to the control signal of the control unit 118, and forms an LUI screen.

Figure 5:
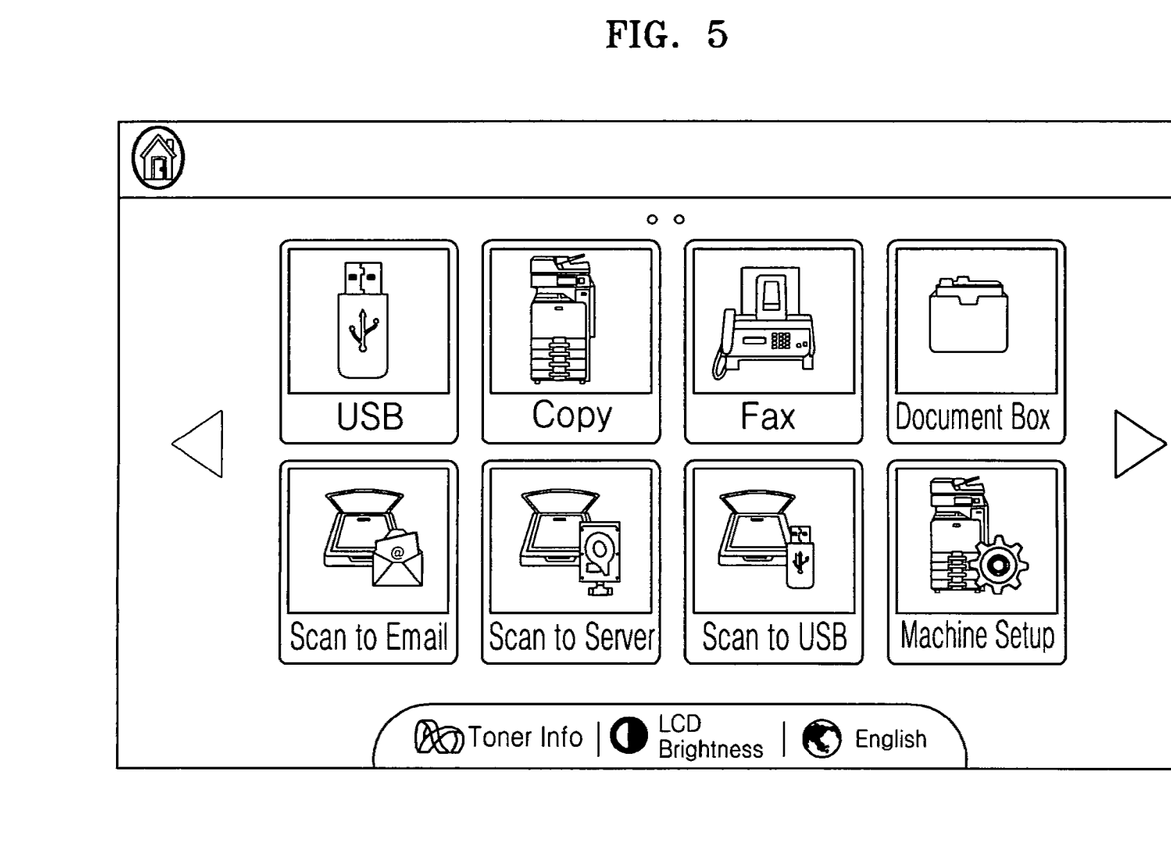
FIG. 5 is an image of an LUI screen generated when no function is currently performed by the image forming apparatus illustrated in FIG. 1, according to an embodiment of the present disclosure.

FIG. 5 is an image of an LUI screen generated when no function is currently performed by the image forming apparatus 110 illustrated in FIG. 1, according to an embodiment of the present disclosure.

If no function is currently performed by the image forming apparatus 110, a user remotely or locally accessing the image forming apparatus 110 may use all functions of the image forming apparatus 110. Accordingly, the web server unit 113 may generate an LUI screen on which all functions of the image forming apparatus 110 are activated as illustrated in FIG. 5.

Figure 6:
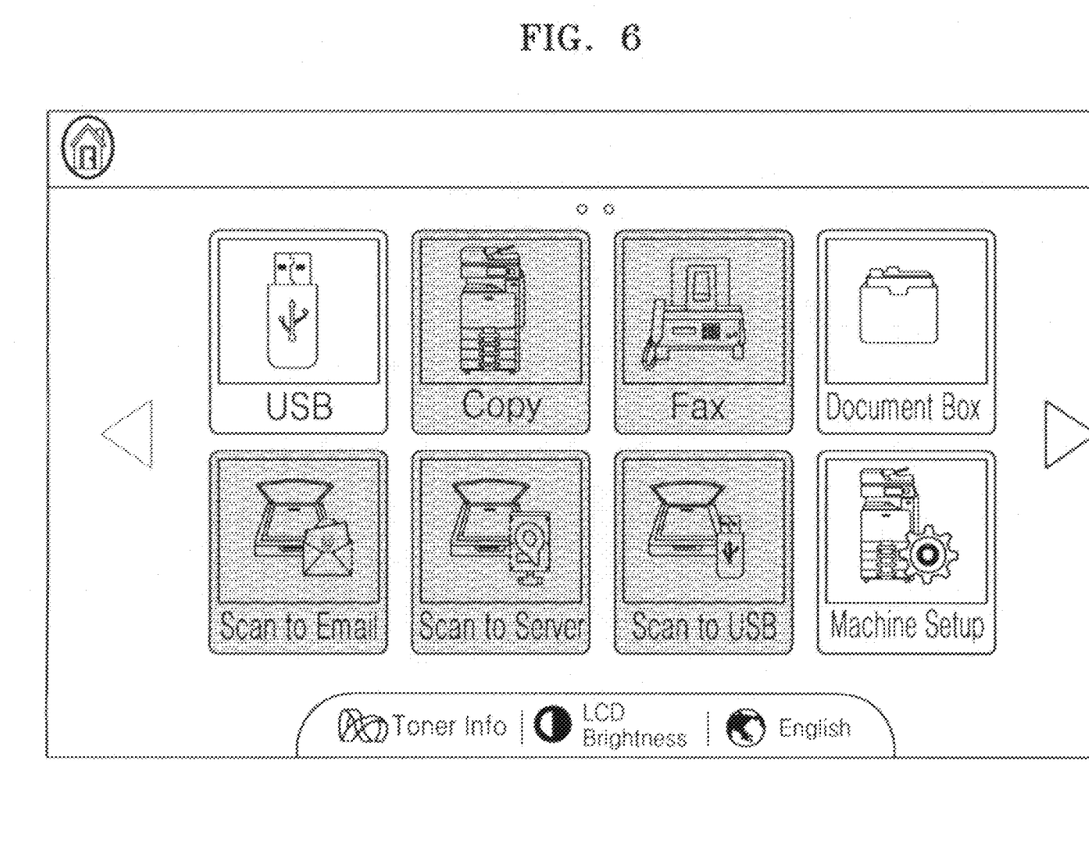
FIG. 6 is an image of an LUI screen generated when a scanner-related function is currently performed by the image forming apparatus illustrated in FIG. 1, according to an embodiment of the present disclosure.

FIG. 6 is an image of an LUI screen generated when a scanner-related function is currently performed by the image forming apparatus 110 illustrated in FIG. 1, according to an embodiment of the present disclosure.

If a scanner-related function is currently performed by the image forming apparatus 110, a user remotely or locally accessing the image forming apparatus 110 may use functions (USB, Document Box, and Machine Setup functions) of the image forming apparatus 110 other than scanner-related functions. Accordingly, the web server unit 113 may generate an LUI screen on which the functions (USB, Document Box, and Machine Setup functions) of the image forming apparatus 110 other than scanner-related functions are activated, as illustrated in FIG. 6.

The LUI screen illustrated in FIG. 5 or 6 and generated by the web server unit 113 may be transmitted via the communication interface unit 111 to the host device 120 connected to the image forming apparatus 110, or may be displayed on the user interface unit 115 of the image forming apparatus 110.

The control unit 118 manages and controls overall operations of the image forming apparatus 110, and controls the image forming apparatus 110 to perform a function selected on the LUI screen.

According to control signals of the control unit 118, the scanning unit 119a generates scan data, the image forming unit 119b prints on paper print data generated by the image forming apparatus 110, the fax unit 119c transmits to an external facsimile machine fax data generated by the image forming apparatus 110, and the transmission unit 119d transmits to a server, a removable storage medium such as a USB memory stick, or an external device such as a computer system transmission data generated by the image forming apparatus 110.

Figure 7:
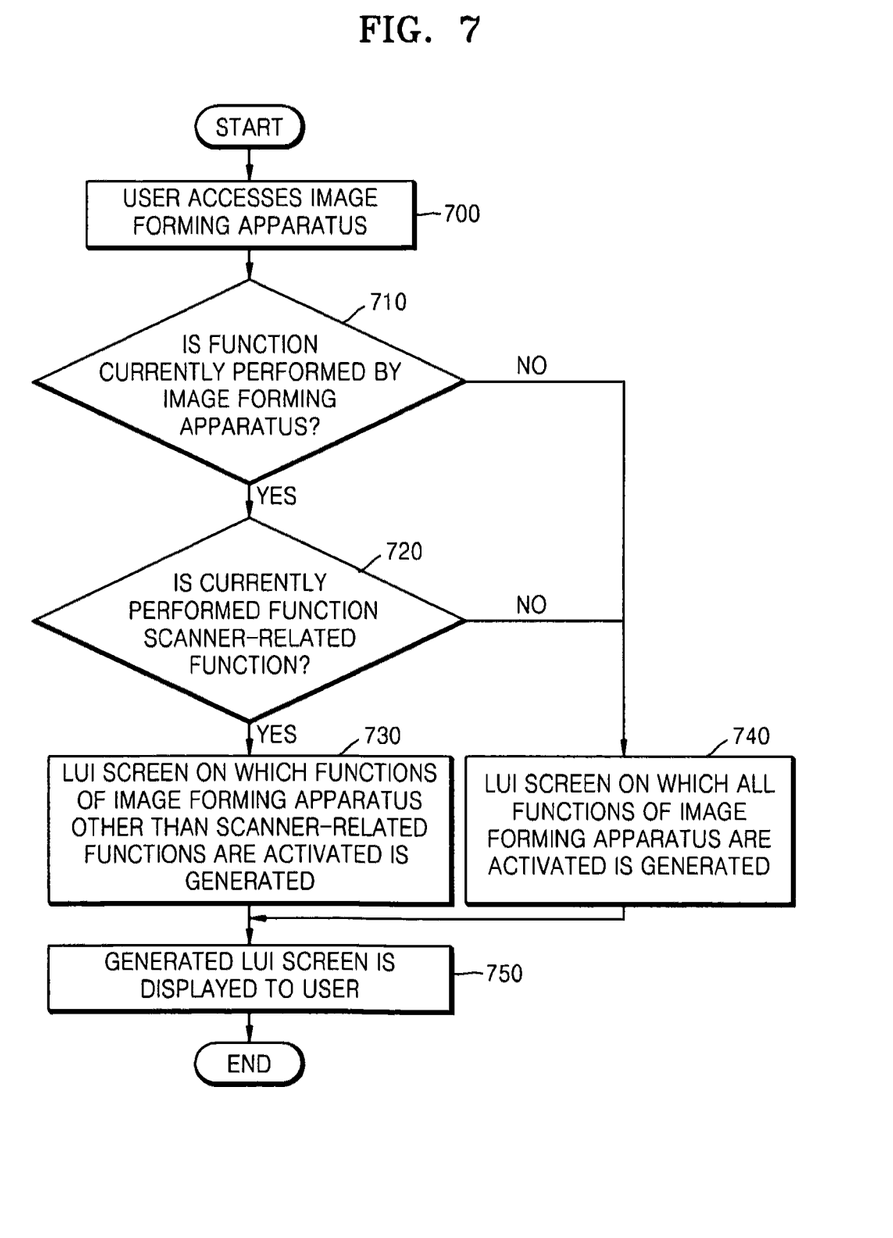
FIG. 7 is a flowchart of a method of controlling accesses of a plurality of users, according to an embodiment of the present disclosure.

FIG. 7 is a flowchart of a method of controlling accesses of a plurality of users, according to an embodiment of the present disclosure. The method is described in conjunction with the image forming apparatus 110 illustrated in FIG. 1.

In operation 700, a user accesses an image forming apparatus. A user using a host device may remotely access the image forming apparatus by using a web browser of the host device, and a user around the image forming apparatus may locally access the image forming apparatus by using a web browser of the image forming apparatus.

In operation 710, it is checked whether a function is currently performed by the image forming apparatus. In more detail, it is checked whether another user already accesses the image forming apparatus, and then is checked whether the other user currently uses a function of the image forming apparatus. If a function is currently performed by the image forming apparatus, the method proceeds to operation 720. Otherwise, if no function is currently performed by the image forming apparatus, the method proceeds to operation 740.

In operation 720, it is checked whether the function currently performed by the image forming apparatus is a scanner-related function. If the function currently performed by the image forming apparatus is a scanner-related function, the method proceeds to operation 730. Otherwise, if the function currently performed by the image forming apparatus is not a scanner-related function, the method proceeds to operation 740.

In operation 730, an LUI screen on which functions of the image forming apparatus other than scanner-related functions are activated is generated. The generated LUI screen is as illustrated in FIG. 6.

In operation 740, an LUI screen on which all functions of the image forming apparatus are activated is generated. The generated LUI screen is as illustrated in FIG. 5.

In operation 750, the generated LUI screen is displayed to the accessing user. If the accessing user is a local user, the LUI screen is displayed on a user interface unit of the image forming apparatus. Otherwise, if the accessing user is a remote user, the LUI screen is transmitted to and is displayed on the host device.

While the present disclosure has been particularly shown and described with reference to exemplary embodiments thereof, it will be understood by one of ordinary skill in the art that various changes in form and details may be made therein without departing from the spirit and scope of the general inventive concept as defined by the following claims. The exemplary embodiments should be considered in a descriptive sense only and not for purposes of limitation. Therefore, the scope of the general inventive concept is defined not by the detailed description of the general inventive concept but by the following claims, and all differences within the scope will be construed as being included in the present general inventive concept.

What is claimed is:

1. An image forming apparatus to generate a user interface screen to be displayed to a first user accessing the image forming apparatus, the image forming apparatus comprising:
   a state management unit to manage state information of the image forming apparatus based on functions currently performed or ready to be performed by a second user accessing the image forming apparatus;
   a determination unit to determine functions allowable to the first user according to the state information and the functions currently performed or ready to be performed by the second user accessing the image forming apparatus;
   a web server unit to generate the user interface screen on which the determined functions are activated according to a result of the determining; and
   a control unit to control the image forming apparatus to display the generated user interface screen to the first user,
   wherein the determined functions allowable to the first user do not conflict with the functions currently performed or ready to be performed by the second user.

2. The image forming apparatus of claim 1, wherein the determination unit determines functions that do not conflict with the currently performed or ready-to-be-performed function, as the functions allowable to the first user.

3. The image forming apparatus of claim 1, wherein, if the currently performed or ready-to-be-performed function is a scanner-related function, the determination unit determines functions other than scanner-related functions, as the functions allowable to the first user.

4. The image forming apparatus of claim 3, wherein the scanner-related function is one of "Copy", "Scan to Email", "Scan to Server", "Scan to USB", and "Fax" functions.

5. The image forming apparatus of claim 1, further comprising:
   a communication interface to perform wired or wireless communication with devices outside the image forming apparatus;
   a first web browser to access the web server unit; and
   a user interface unit to display the user interface screen,
   wherein the first user accesses the web server unit via the communication interface by using a web browser of one of the devices or by using the first web browser.

6. The image forming apparatus of claim 5, wherein, if the first user accesses the web server unit by using a web browser of one of the devices, the control unit controls the communication interface unit to transmit the generated user interface screen to the accessing device.

7. The image forming apparatus of claim 5, wherein, if the first user accesses the web server unit by using the first web browser, the control unit controls the user interface unit to display the generated user interface screen.

8. The image forming apparatus of claim 5, further comprising a session management unit to manage a connection state between the image forming apparatus and a host device accessing the image forming apparatus.

9. The image forming apparatus of claim 8, wherein if the host device accesses the communication interface unit, the session management unit registers the accessing host device.

10. The image forming apparatus of claim 1, further comprising:
    a scanning unit to generate scan data;
    an image forming unit to prints on a printing medium print data generated by the image forming apparatus;
    a fax unit to transmits to an external facsimile machine fax data generated by the image forming apparatus; and
    a transmission unit to transmits to a server, a removable storage medium, or an external device data generated by the image forming apparatus.

11. The image forming apparatus of claim 1, wherein, the first user performs a first function accessing the image forming apparatus simultaneously while the second user performs a second function accessing the image forming apparatus, the first function being a determined function allowable to the first user which does not conflict with the second function being performed by the second user accessing the image forming apparatus.

12. A method of generating a user interface screen for an image forming apparatus, the method comprising:
    accessing, by a first user, the image forming apparatus;
    checking state information of the image forming apparatus based on functions currently performed or ready to be performed by a second user accessing the image forming apparatus;
    determining functions allowable to the first user according to the state information and the functions currently performed or ready to be performed by the second user accessing the image forming apparatus;
    generating the user interface screen on which the determined functions are activated according to a result of the determining; and
    displaying the generated user interface screen to the first user,
    wherein the determined functions allowable to the first user do not conflict with the functions currently performed or ready to be performed by the second user.

13. The method of claim 12, wherein the determining comprises determining functions that do not conflict with the currently performed or ready-to-be-performed function, as the functions allowable to the first user.

14. The method of claim 12, wherein, if the currently performed or ready-to-be-performed function is a scanner-related function, the determining comprises determining functions other than scanner-related functions, as the functions allowable to the first user.

15. The method of claim 14, wherein the scanner-related function is one of "Copy", "Scan to Email", "Scan to Server", "Scan to USB", and "Fax" functions.

16. The method of claim 12, wherein the accessing of the image forming apparatus comprises accessing a web server unit of the image forming apparatus by using a web browser of one of a plurality of devices outside the image forming apparatus or by using a web browser in the image forming apparatus.

17. The method of claim 16, wherein, if the first user accesses the web server unit by using a web browser of one of the devices, the displaying comprises transmitting the generated user interface screen to the accessing device.

18. The method of claim 16, wherein, if the first user accesses the web server unit by using the web browser in the image forming apparatus, the displaying comprises displaying the generated user interface screen on a user interface unit of the image forming apparatus.

19. The method of claim 12, wherein, if the state information indicates functions currently performed or ready to be performed by the second user accessing the image forming apparatus are scanner-related functions, the determining comprises:
  preventing the first user from performing the scanner-related functions, and
  determining that at least one other function is allowable to the first user, the at least one other function including at least one of searching of a document stored in the image forming apparatus, printing of a document, and set-up options of the image forming apparatus.

* * * * *